(12) United States Patent
Yun et al.

(10) Patent No.: US 10,313,170 B2
(45) Date of Patent: Jun. 4, 2019

(54) DEVICE AND METHOD FOR TRANSMITTING FILTER BANK MULTI-CARRIER SYMBOLS IN WIRELESS COMMUNICATION SYSTEM

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Yeohun Yun, Hwaseong-si (KR); Sooyong Choi, Seoul (KR); Moonchang Choi, Seoul (KR); Seongbae Han, Seoul (KR); Hyung-Ju Nam, Seoul (KR); Sang-Joon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/580,871

(22) PCT Filed: Jun. 3, 2016

(86) PCT No.: PCT/KR2016/005882
§ 371 (c)(1),
(2) Date: Dec. 8, 2017

(87) PCT Pub. No.: WO2016/200095
PCT Pub. Date: Dec. 15, 2016

(65) Prior Publication Data
US 2018/0167246 A1 Jun. 14, 2018

(30) Foreign Application Priority Data
Jun. 8, 2015 (KR) ........................ 10-2015-0080646

(51) Int. Cl.
*H04L 27/26* (2006.01)

(52) U.S. Cl.
CPC ...... *H04L 27/2608* (2013.01); *H04L 27/2602* (2013.01); *H04L 27/264* (2013.01); *H04L 27/2607* (2013.01); *H04L 27/2649* (2013.01)

(58) Field of Classification Search
None
See application file for complete search history.

(56) References Cited

U.S. PATENT DOCUMENTS

| 2012/0189036 A1 | 7/2012 | Bellanger | |
| 2014/0153675 A1* | 6/2014 | Dandach | ............. H04L 27/2684 375/340 |

(Continued)

FOREIGN PATENT DOCUMENTS

| KR | 20150035424 A | 4/2015 |
| WO | 2014085710 A1 | 6/2014 |

(Continued)

OTHER PUBLICATIONS

Lin et al.; "An Advanced Multi-Carrier Modulation for Future Radio Systems"; 2014 IEEE International Conference on Acoustic, Speech and Signal Processing (ICASSP); May 4-9, 2014; Florence, Italy; 5 pages.

(Continued)

*Primary Examiner* — Joseph A Bednash

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present invention relates to the transmission and the reception of filter bank multi-carrier (FBMC) symbols in a wireless communication system, a method for operating a transmitting end comprises the step of: generating a first symbol in which sample values of a front end are shifted to a rear end; generating a second symbol in which sample values of a rear end are shifted to a front end; and trans- (Continued)

mitting a plurality of symbols comprising the first symbol and the second symbol on a time axis in an overlapping manner.

18 Claims, 21 Drawing Sheets

(56) References Cited

U.S. PATENT DOCUMENTS

| | | | |
|---|---|---|---|
| 2014/0233437 A1* | 8/2014 | Abdoli | H04L 5/0007 370/280 |
| 2015/0036507 A1* | 2/2015 | Thubert | H04L 47/125 370/237 |
| 2015/0063507 A1 | 3/2015 | Dore et al. | |
| 2016/0269217 A1 | 9/2016 | Nam et al. | |

FOREIGN PATENT DOCUMENTS

| | | | | |
|---|---|---|---|---|
| WO | WO-2014085710 A1 * | 6/2014 | | H04L 5/0066 |
| WO | 2015024994 A1 | 2/2015 | | |
| WO | WO-2015024994 A1 * | 2/2015 | | H04L 27/264 |

OTHER PUBLICATIONS

Edfors et al.; "An Introduction to Orthogonal Frequency-Division Multiplexing"; Luleå: Luleå University of Technology; 1997; 58 pages.

Bellanger, M.; "FS-FBMC: an alternative scheme for filter bank based multicarrier transmission"; Proceedings of the 5th International Symposium on Communications, Control and Signal Processing, ISCCSP 2012; May 2-4, 2012; Rome Italy; 4 pages.

Zakaria et al.; "On ISI Cancellation in MIMO-ML Detection Using FBMC/QAM Modulation"; 2012 International Symposium on Wireless Communication Systems (ISWCS); Aug. 28-31, 2012; Paris, France; 5 pages.

Abdoli et al.; "Weighted Circularly Convolved Filtering in OFDM/ OQAM" 2013 IEEE 24th International Symposium on Personal, Indoor and Mobile Radio Communications: Fundamentals and PHY Track; Sep. 8-11, 2013; London, United Kingdom; 5 pages.

* cited by examiner

| 4 | 5 | 6 | 7 | 8 | 9 | 10 | 11 | ~1001 |
|---|---|---|---|---|---|---|---|---|
| 3 | 4 | 5 | 6 | 7 | 8 | 1 | 1 | ~1002 |
| 2 | 3 | 4 | 5 | 6 | 7 | 8 | 2 | ~1003 |
| 1 | 2 | 3 | 4 | 5 | 6 | 7 | 8 | ~1004 |

| 1 | 2 | 3 | 4 | 5 | 6 | 7 | 8 | ~1005 |
|---|---|---|---|---|---|---|---|---|
| 8 | 1 | 2 | 3 | 4 | 5 | 6 | 7 | ~1006 |
| 7 | 8 | 1 | 2 | 3 | 4 | 5 | 6 | ~1007 |
| 6 | 7 | 8 | 1 | 2 | 3 | 4 | 5 | ~1008 |

DEVICE AND METHOD FOR TRANSMITTING FILTER BANK MULTI-CARRIER SYMBOLS IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/005882 filed on Jun. 3, 2016, entitled "DEVICE AND METHOD FOR TRANSMITTING FILTER BANK MULTI-CARRIER SYMBOLS IN WIRELESS COMMUNICATION SYSTEM", and through Korean Patent Application No. 10-2015-0080646 filed Jun. 8, 2015, each of which are incorporated herein by reference into the present disclosure as if fully set forth herein.

TECHNICAL FIELD

The present invention relates to transmitting and receiving filter bank multi-carrier (FBMC) symbols in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The FBMC refers to a technique for generating a transmission symbol having low out-of-band radiation using a filter bank. The FBMC may relatively reduce the number of guard subcarriers for satisfying the same spectrum mask, compared to orthogonal frequency division multiplexing (OFDM). In addition, when the FBMC is applied, it is possible to modulate and demodulate signals without a cyclic prefix, and accordingly, a spectral efficiency increases and a feature of coping with a frequency synchronization error appears.

SUMMARY

One embodiment of the present invention provides an apparatus and a method for transmitting and receiving filter bank multi-carrier (hereinafter, referred to as "FBMC") symbols in a wireless communication system.

Another embodiment of the present invention provides an apparatus and a method for reducing a time required to transmit FBMC symbols in a wireless communication system.

Still another embodiment of the present invention provides an apparatus and a method for circularly shifting FBMC symbols in a wireless communication system.

Yet another embodiment of the present invention provides an apparatus and a method for determining a shift pattern regarding FBMC symbols according to a communication environment in a wireless communication system.

According to exemplary embodiments of the present invention, a method for operating of a transmitting end in a wireless communication system includes: generating a first symbol in which sample values of a front end are shifted to a rear end; generating a second symbol in which sample values of a rear end are shifted to a front end; and transmitting a plurality of symbols comprising the first symbol and the second symbol on a time axis in an overlapping manner.

According to exemplary embodiments of the present invention, a method for operating of a receiving end in a wireless communication system includes: receiving a signal in which a plurality of symbols overlap one another on a time axis; detecting a first symbol in which sample values of a front end are shifted to a rear end from among the plurality of symbols; and detecting a second symbol in which sample values of a rear end are shifted to a front end from among the plurality of symbols.

According to exemplary embodiments of the present invention, a transmitting end apparatus in a wireless communication system includes: a controller configured to control to generate a first symbol in which sample values of a front end are shifted to a rear end, and generate a second symbol in which sample values of a rear end are shifted to a front end; and a transmitter configured to transmit a plurality of symbols comprising the first symbol and the second symbol on a time axis in an overlapping manner.

According to exemplary embodiments of the present invention, a receiving end apparatus in a wireless communication system includes: a receiver configured to receive a signal in which a plurality of symbols overlap one another on a time axis; and a controller configured to control to detect a first symbol in which sample values of a front end are shifted to a rear end from among the plurality of symbols, and detect a second symbol in which sample values of a rear end are shifted to a front end from among the plurality of symbols.

In a wireless communication system, the time required to transmit FBMC symbols can be reduced by selectively shifting sample values of the FBMC symbol. Accordingly, an FBMC-based system can be efficiently operated, and furthermore, power spectrum density (PSD) and degradation of channel reception performance can be reduced by selectively shifting blocks considering the feature of well-localization of an FBMC filter.

BRIEF DESCRIPTION OF THE DRAWINGS

FIG. 10 illustrates FBMC symbols after a selective shift in a wireless communication system according to an exemplary embodiment of the present invention;

FIGS. 15A, 15B, 15C, and 15D illustrate examples of symbol shift patterns according to a communication environment in a wireless communication system according to an exemplary embodiment of the present invention;

DETAILED DESCRIPTION

Operation principles of the present invention will be described in detail herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, the present invention describes technology for transmitting and receiving filter bank multi-carrier (hereinafter, referred to as "FBMC) symbols in a wireless communication system. Specifically, the present invention describes various embodiments for reducing a time required to transmit FBMC symbols.

The term indicating a signal or a symbol, the terms indicating signal processing means, the terms indicating communication entities, or the like, which are used in the following description, are merely examples for convenience of explanation. Accordingly, the present invention is not limited to the terms which will be described later and other terms having equivalent technical meanings may be used.

Figure 1:
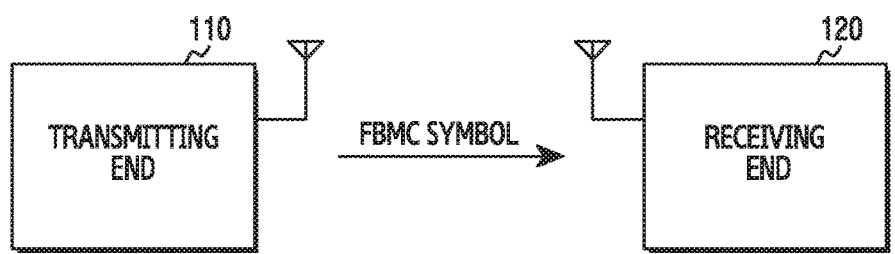
FIG. 1 illustrates a transmitting end and a receiving end in a wireless communication system according to an embodiment of the present invention.

FIG. 1 illustrates a transmitting end and a receiving end in a wireless communication system according to an embodiment of the present invention. Referring to FIG. 1, the transmitting end 110 transmits an FBMC symbol to the receiving end 120. That is, the wireless communication system according to an embodiment of the present invention may employ an FBMC technique, and the transmitting end 110 may generate at least one FBMC symbol and the receiving end 120 may interpret at least one FBMC symbol. The transmitting end 110 and the receiving end 120 are relatively distinguished from each other and may operate as a subject to transmit and receive data at a specific time. That is, the receiving end 120 may transmit control information or the like for receiving data, and may transmit data according to a situation.

Each of the transmitting end 110 and the receiving end 120 may be a user device or a network device as an electronic device. The user device may be referred to as a terminal, a mobile station, user equipment, or the like, and the network device may be referred to as a base station, a node B, an evolved node B (e node B), or the like. For example, both the transmitting end 110 and the receiving end 120 may be terminals or they may be a terminal and a base station.

Figure 2:
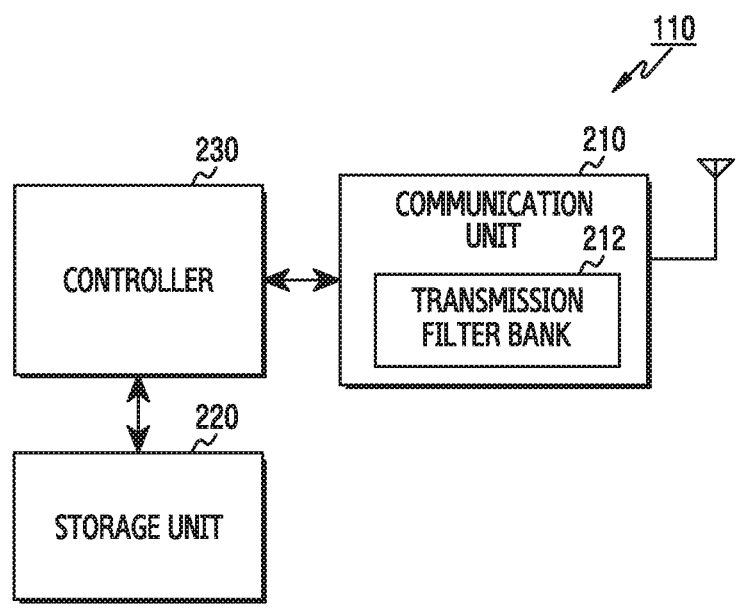
FIG. 2 illustrates a block configuration of a transmitting end in a wireless communication system according to an embodiment of the present invention.

FIG. 2 illustrates a block configuration of a transmitting end in a wireless communication system according to an embodiment of the present invention. The term such as "unit" or the term with the suffix "-er" or "-or" used hereinbelow refers to a unit for processing at least one function or operation, and may be implemented by hardware, software, or a combination of hardware or software.

Referring to FIG. 2, the transmitting end 110 includes a communication unit 210, a storage unit 220, and a controller 230.

The communication unit 210 performs functions of transmitting and receiving signals through a radio channel. For example, the communication unit 210 performs a function of converting between a base band signal and a bit string according to a physical layer standard of the system. For example, when transmitting data, the communication unit 210 generates complex symbols by encoding and modulating a transmission bit string. In addition, when receiving data, the communication unit 210 restores a reception bit string by demodulating and decoding a baseband signal. In addition, the communication unit 210 up-converts a baseband signal into a radio frequency (RF) band signal and then transmits the RF band signal through an antenna, and down-converts an RF band signal received through the antenna into a baseband signal. In particular, the communication unit 210 includes a transmission filter bank 212 for generating an FBMC symbol. Furthermore, the communication unit 210 may include a transmission filter, a reception filter, an amplifier, a mixer, an oscillator, a digital to analogue converter (DAC), an analog to digital converter (ADC), or the like.

In addition, the communication unit 210 may include a plurality of RF chains. Furthermore, the communication unit 210 may perform beamforming. To perform beamforming, the communication unit 210 may adjust a phase and a size of each of signals transmitted and received through a plurality of antennas or antenna elements. Furthermore, the communication unit 210 may include a plurality of communication modules for supporting a plurality of different wireless access technologies. The communication unit 210 may transmit and receive signals as described above. Accordingly, the communication unit 210 may be referred to as a transmitter, a receiver, or a transceiver.

The storage unit 220 stores data such as a basic program for the operation of the transmitting end 110, an application program, setting information, or the like. In particular, the storage unit 220 may store data for signaling with the receiving end 120, in other words, data for interpreting a message from the receiving end 120. In addition, the storage unit 220 provides stored data according to a request of the controller 230.

The controller 230 controls overall operations of the transmitting end 110. For example, the controller 230 transmits and receives signals through the communication unit 210. In addition, the controller 230 records and reads out data on and from the storage unit 220. To achieve this, the controller 230 may include at least one processor. For example, the controller 230 may include a communication processor (CP) for controlling communication and an application processor (AP) for controlling an upper layer such as an application program. According to an embodiment of the present invention, the controller 230 may determine a shift pattern regarding FBMC symbols and transmit FBMC symbols which are selectively shifted according to the determined shift pattern. For example, the controller 230 may control the transmitting end 110 to perform FBMC symbol transmitting procedures which will be described later.

Figure 3:
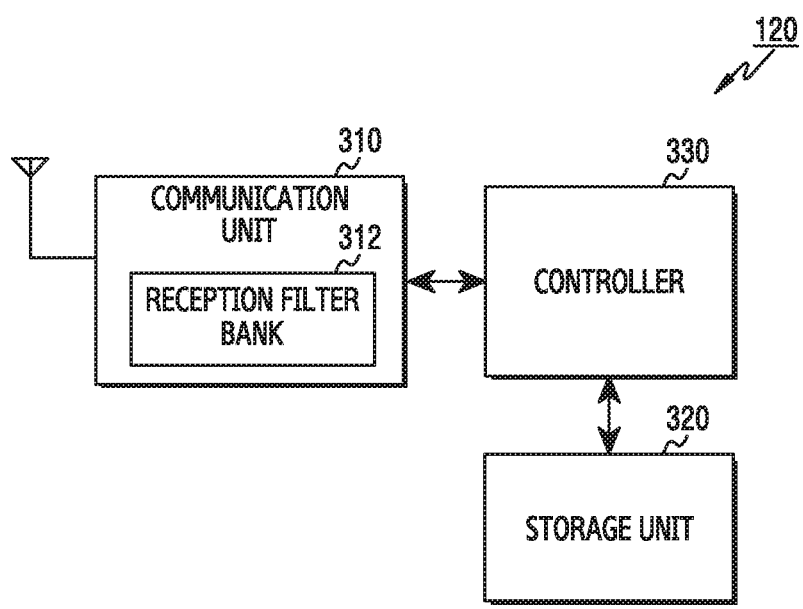
FIG. 3 illustrates a block configuration of a receiving end in a wireless communication system according to an embodiment of the present invention.

FIG. 3 illustrates a block configuration of a receiving end in a wireless communication system according to an embodiment of the present invention. The term such as "unit" or the term with the suffix "-er" or "-or" used hereinbelow refers to a unit for processing at least one function or operation, and may be implemented by hardware, software, or a combination of hardware or software.

Referring to FIG. 3, the receiving end 120 includes a communication unit 310, a storage unit 320, and a controller 330.

The communication unit 310 performs functions of transmitting and receiving signals through a radio channel. For example, the communication unit 310 performs a function of converting between a base band signal and a bit string according to a physical layer standard of the system. For example, when transmitting data, the communication unit 310 generates complex symbols by encoding and modulating a transmission bit string. In addition, when receiving data, the communication unit 310 restores a reception bit string by demodulating and decoding a baseband signal. In addition, the communication unit 310 up-converts a baseband signal into an RF band signal and then transmits the RF band signal through an antenna, and down-converts an RF band signal received through the antenna into a baseband signal. In particular, the communication unit 310 includes a reception filter bank 312 for interpreting an FBMC symbol. Furthermore, the communication unit 310 may include a transmission filter, a reception filter, an amplifier, a mixer, an oscillator, a DAC, an ADC, or the like.

In addition, the communication unit 310 may include a plurality of RF chains. Furthermore, the communication unit 310 may perform beamforming. To perform beamforming, the communication unit 310 may adjust a phase and a size of each of signals transmitted and received through a plurality of antennas or antenna elements. Furthermore, the communication unit 310 may include a plurality of communication modules for supporting a plurality of different wireless access technologies. The communication unit 310 may transmit and receive signals as described above. Accordingly, the communication unit 310 may be referred to as a transmitter, a receiver, or a transceiver.

The storage unit 320 stores data such as a basic program for the operation of the receiving end 120, an application program, setting information, or the like. In particular, the storage unit 320 may store data for signaling with the transmitting end 110, in other words, data for interpreting a message from the transmitting end 110. In addition, the storage unit 320 provides stored data according to a request of the controller 330.

The controller 330 controls overall operations of the receiving end 120. For example, the controller 330 transmits and receives signals through the communication unit 310. In addition, the controller 330 records and reads out data on and from the storage unit 320. To achieve this, the controller 330 may include at least one processor. For example, the controller 330 may include a CP for controlling communication and an AP for controlling an upper layer such as an application program. According to an embodiment of the present invention, the controller 330 may receive FBMC symbols which are selectively shifted and may interpret the FBMC symbols based on a shift pattern regarding the FBMC symbols. For example, the controller 330 may control the receiving end 120 to perform FBMC symbol receiving procedure which will be described later.

Figure 4:
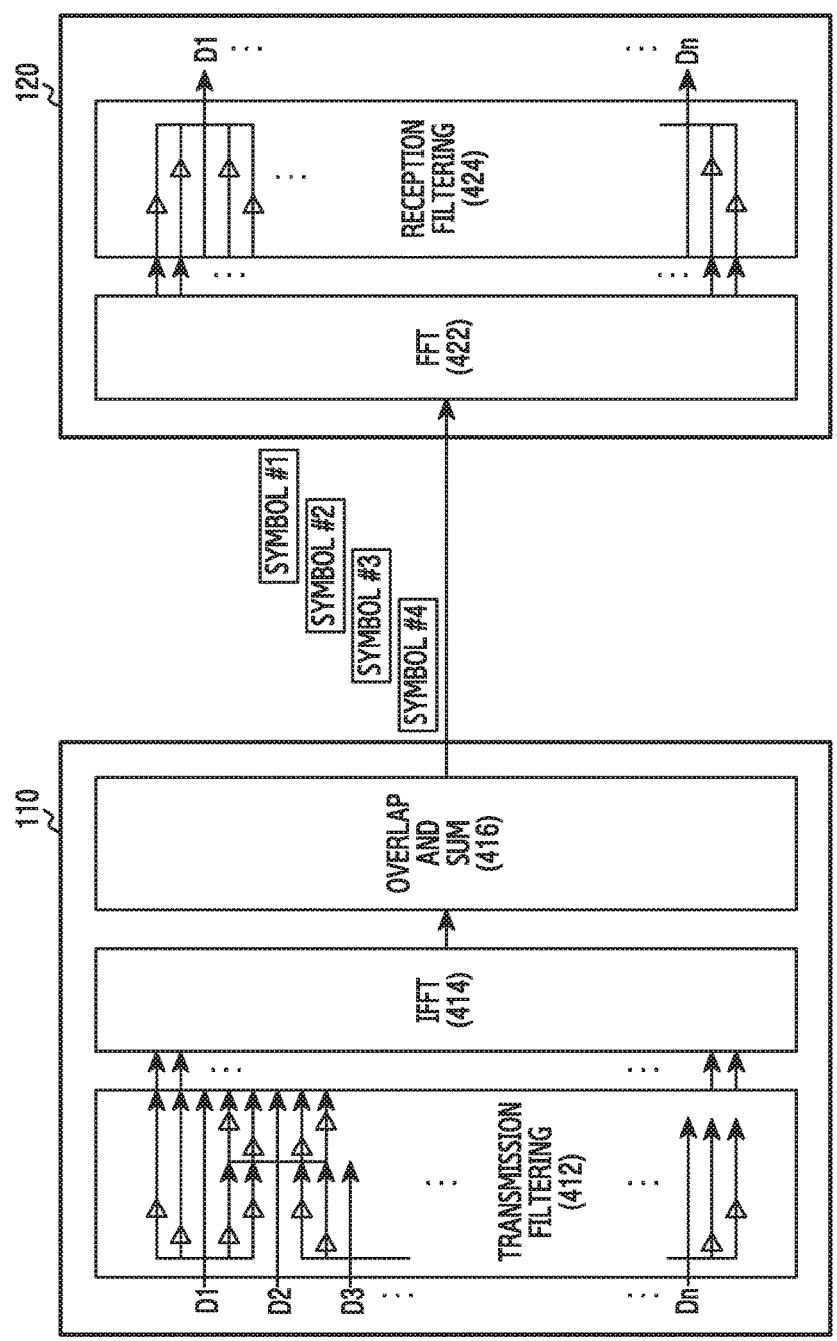
FIG. 4 illustrates an example of a functional configuration of a transmitting end and a receiving end for generating and interpreting a filter bank multi-carrier (hereinafter, referred to as "FBMC") symbol in a wireless communication system according to an embodiment of the present invention.

FIG. 4 illustrates an example of a functional configuration of a transmitting end and a receiving end for generating and interpreting an FBMC symbol in a wireless communication system according to an embodiment of the present invention. FIG. 4 illustrates a case in which filtering is performed in a frequency domain. The term such as "unit" or the term with the suffix "-er" or "-or" used hereinbelow refers to a unit for processing at least one function or operation, and may be implemented by hardware, software, or a combination of hardware or software Referring to FIG. 4, the transmitting end 110 includes a transmission filtering module 412, an inverse fast Fourier transform (hereinafter, referred to as "IFFT") module 414, and an overlap and sum module 416. The receiving end 120 includes a fast Fourier transform (hereinafter, referred to as "FFT") module 422 and a reception filtering module 424.

The transmission filtering module 412 corresponds to the transmission filter bank 212 of FIG. 2. The transmission filtering module 412 oversamples data symbols D1 to Dn and then filters the data symbols. Although a filter order K is 2 and an oversampling factor is 5 (=2×K+1) in the case of FIG. 4, other filter orders and other oversampling factors may be applied. For example, in the case of D1, the transmission filtering module 412 generates five (5) sample values which are the same as the D1 value by oversampling D1, and multiplies the five (5) sample values by filter coefficients. Similarly, the transmission filtering module 412 oversamples respective data symbols D2 to Dn and then multiplies results of oversampling by filter coefficients. In this case, portions of filtered samples of adjacent data symbols are summed. For example, two filtered samples of D1 and two filtered samples of D2 are summed. In this case, one of the adjacent data symbols may be divided into a real value and an imaginary value of a complex symbol or different filters may be applied to the adjacent data symbols, such that the sampled values which are summed are separated at the receiving end 120.

The IFFT module 414 performs an IFFT arithmetic operation with respect to the filtered samples of the data symbols which are outputted from the transmission filtering module 412. In other words, the IFFT module 414 generates an FBMC symbol including D1 to Dn using the filtered samples of the data symbols. That is, the IFFT module 414 generates a multi-carrier signal through the IFFT arithmetic operation. In this case, the length of the FBMC symbol is larger than the number n of data symbols since the data symbols D1 to Dn have been oversampled. The overlap and sum module 416 partially overlaps and sums the FBMC symbols which are generated by the IFFT module 414. The FBMC symbols are not independently transmitted on a time axis and a portion of the FBMC symbols is transmitted in an overlapping manner. Specifically, the rear end of the first FBMC symbol and the front end of the second FBMC symbol overlap each other. That is, the overlap and sum module 416 arranges the FBMC symbols at a pre-defined interval and sums samples of the FBMC symbols located at the same time, thereby generating a transmission signal. Herein, the pre-defined interval may be the number n of data symbols.

Although not shown in FIG. 4, the transmitting end 110 may further include at least one module for transmitting the transmission signal generated by the overlap and sum module 416. The transmission signal generated by the overlap and sum module 416 is a digital baseband signal. Accordingly, the transmitting end may further include at least one module for converting the transmission signal into an analogue signal and for up-converting the analogue signal into a signal of an RF band. Thereafter, the transmission signal including the FBMC symbols may be received at the receiving end 120. Similarly, the receiving end 120 may further include at least one module for converting a reception signal into a digital baseband signal.

The FFT module 422 performs an FFT arithmetic operation with respect to the reception signal. In this case, the FFT module 422 extracts as many samples as the length of one FBMC symbol from the reception signal which is generated by performing overlapping and summing with respect to the FBMC symbols, and performs the FFT arithmetic operation. The reception filtering module 424 filters the samples corresponding to one FBMC symbols and provided from the FFT module, and downsamples the samples. Accordingly, the data symbols D1 to Dn may be restored. For example, to restore D1, the reception filtering module 424 multiplies five (5) samples from among the samples of the FFT-calculated reception signal by filter coefficients, and sums the samples.

Figure 5:
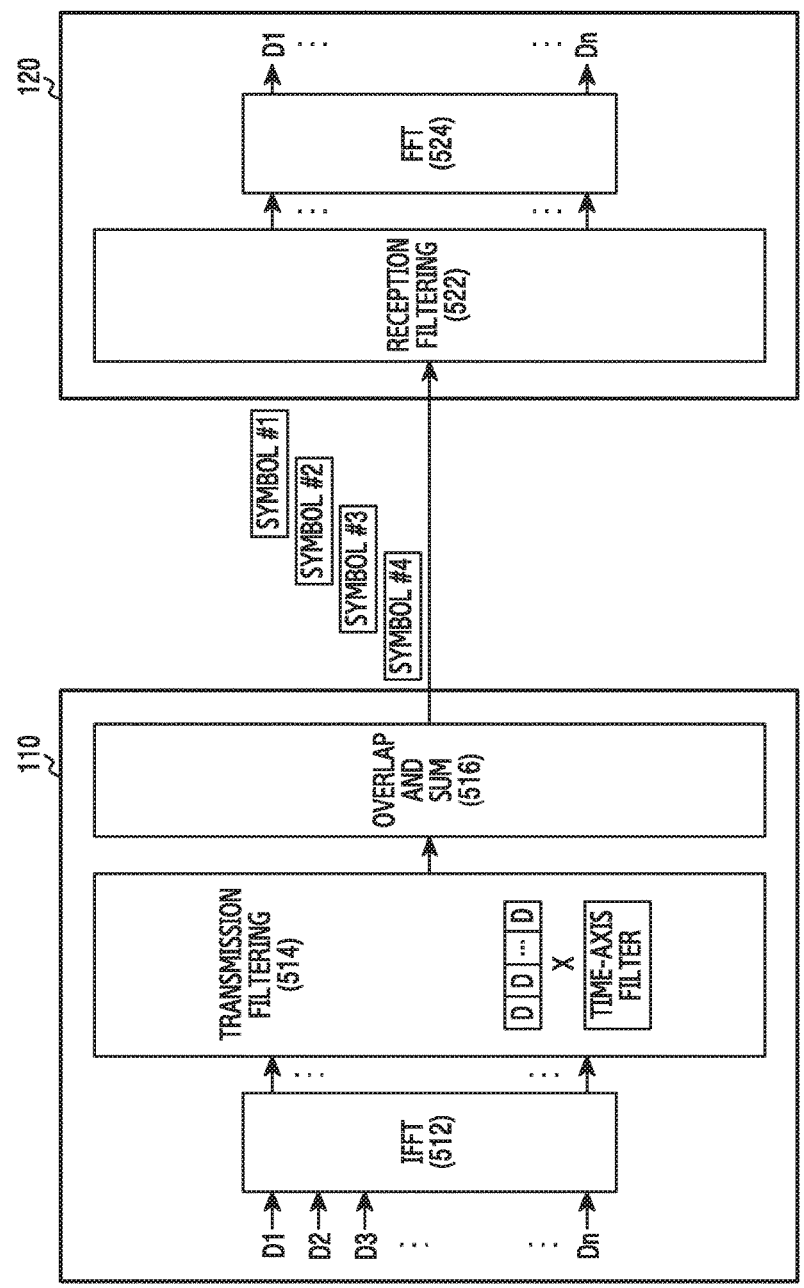
FIG. 5 illustrates another example of a functional configuration of a transmitting end and a receiving end for generating and interpreting an FBMC symbol in a wireless communication system according to an exemplary embodiment of the present invention.

FIG. 5 illustrates another example of a functional configuration of a transmitting end and a receiving end for generating and interpreting an FBMC symbol in a wireless communication system according to an embodiment of the present invention. FIG. 5 illustrates a case in which filtering is performed in a time domain. The term such as "unit" or the term with the suffix "-er" or "-or" used hereinbelow refers to a unit for processing at least one function or operation, and may be implemented by hardware, software, or a combination of hardware or software.

Referring to FIG. 5, the transmitting end 110 includes an IFFT module 512, a transmission filtering module 514, and an overlap and sum module 516. The receiving end 120 includes a reception filtering module 522 and an FFT module 524.

The IFFT module 512 performs an IFFT arithmetic operation with respect to data symbols D1 to Dn. Accordingly, the result of IFFT equals the number n of data symbols. The transmission filtering module 514 may perform time-axis filtering with respect to the result of IFFT. The transmission filtering module 514 is the transmission filtering module 412 of FIG. 4 implemented in the time domain and generates the same output as the IFFT module 414 of FIG. 4. The operation of the transmission filtering module 412 of FIG. 4 corresponds to a convolution arithmetic operation on a frequency axis and an arithmetic operation of a corresponding time domain may be implemented by signal repetition and filtering. Specifically, the transmission filtering module 514 duplicates IFFT $\{D\}$ which is the result of IFFT provided from the IFFT module 512 as many times as the filter order of the transmission filtering module 412, and multiplies the duplicated IFFT $\{D\}$ by a transmission filter of the time domain corresponding to a frequency domain filter of the transmission filtering module 414 of FIG. 4. Accordingly, FBMC symbols are generated.

The overlap and sum module 516 partially overlaps and sums the FBMC symbols generated by the transmission filtering module 514. The FBMC symbols are not independently transmitted on a time axis and a portion of the FBMC symbols is transmitted in an overlapping manner. Specifically, the rear end of the first FBMC symbol and the front end of the second FBMC symbol overlap each other. That is, the overlap and sum module 516 arranges the FBMC symbols at a pre-defined interval and sums samples of the FBMC symbols located at the same time, thereby generating a transmission signal. Herein, the pre-defined interval may be the number n of data symbols.

Although not shown in FIG. 5, the transmitting end 110 may further include at least one module for transmitting the transmission signal generated by the overlap and sum module 516. The transmission signal generated by the overlap and sum module 516 is a digital baseband signal. Accordingly, the transmitting end may further include at least one module for converting the transmission signal into an analogue signal and for up-converting the analogue signal into a signal of an RF band. Thereafter, the transmission signal including the FBMC symbols may be received at the receiving end 120. Similarly, the receiving end 120 may further include at least one module for converting a reception signal into a digital baseband signal.

The reception filtering module 522 performs time domain filtering using a reception filter corresponding to the transmission filter used in the transmission filtering module 514. In this case, the reception filtering module 522 extracts as many samples as the length of one FBMC symbol from the reception signal generated by performing overlapping and summing with respect to the FBMC symbols, and performs reception filtering. In addition, the reception filtering module 522 divides the signal according to a repetition order and sums the divided signals. Accordingly, a signal (for example, IFFT$\{D\}$) before transmission filtering is performed may be restored. The FFT module 524 performs an FFT arithmetic operation with respect to the signal provided from the reception filtering module 522. Accordingly, the data symbols D1 to Dn may be restored.

Figure 6:
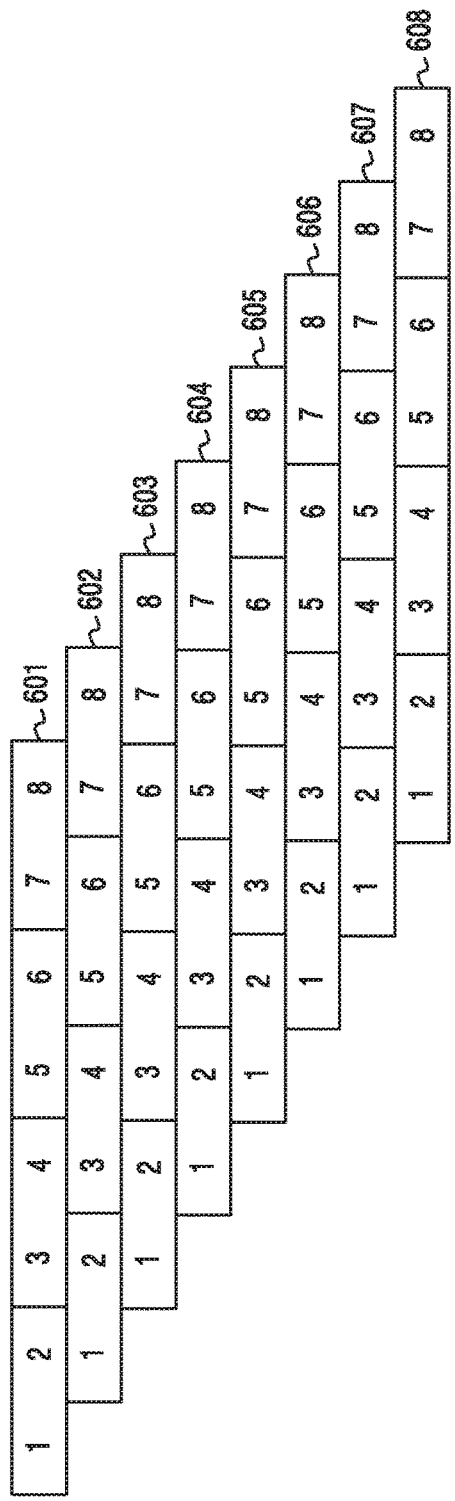
FIG. 6 illustrates overlapping transmission of FBMC symbols in a wireless communication system according to an exemplary embodiment of the present invention.

FIG. 6 illustrates overlapping transmission of FBMC symbols in a wireless communication system according to an exemplary embodiment of the present invention. FIG. 6 illustrates blocks constituting FBMC symbols 601 to 608 according to an order of generating and transmitting. Although FIG. 6 illustrates eight (8) symbols, seven or less or nine or more symbols may overlap one another.

Referring to FIG. 6, each of the FBMC symbols 601 to 608 includes eight (8) blocks. The block included in the FBMC symbols 601 to 608 is a unit including a pre-defined number of samples and includes at least one sample. Unlike in the embodiment of FIG. 6, each of the FBMC symbols 601 to 608 may be divided into seven or less or nine or more blocks according to the number of samples in each block. The FBMC symbols 601 to 608 may be transmitted at a time interval corresponding to one block, and are partially summed in an overlapping time section. That is, at least two blocks except for block #1 of the first FBMC symbol 601 and block #8 of the eighth FBMC symbol 608 overlap one another.

Specifically, block #1 of the first FBMC block 601 is transmitted without overlapping. Block #2 of the first FBMC symbol 601 and block #1 of the second FBMC symbol 602 are transmitted in an overlapping manner. Block #3 of the first FBMC symbol 601, block #2 of the second FBMC symbol 602, and block #1 of the third FBMC symbol 603 are transmitted in an overlapping manner. Block #4 of the first FBMC symbol 601, block #3 of the second FBMC symbol 602, block #2 of the third FBMC symbol 603, and block #1 of the fourth FBMC symbol 604 are transmitted in an overlapping manner. Block #5 of the first FBMC symbol 601, block #4 of the second FBMC symbol 602, block #3 of the third FBMC symbol 603, block #2 of the fourth FBMC symbol 604, and block #1 of the fifth FBMC symbol 605 are transmitted in an overlapping manner. Block #6 of the first FBMC symbol 601, block #5 of the second FBMC symbol 602, block #4 of the third FBMC symbol 603, block #3 of the fourth FBMC symbol 604, block #2 of the fifth FBMC symbol 605, and block #1 of the sixth FBMC symbol 606 are transmitted in an overlapping manner. Block #7 of the first FBMC symbol 601, block #6 of the second FBMC symbol 602, block #5 of the third FBMC symbol 603, block #4 of the fourth FBMC symbol 604, block #3 of the fifth FBMC symbol 605, block #2 of the sixth FBMC symbol 606, and block #1 of the seventh FBMC symbol 607 are transmitted in an overlapping manner. Block #8 of the first FBMC symbol 601, block #7 of the second FBMC symbol 602, block #6 of the third FBMC symbol 603, block #5 of the fourth FBMC symbol 604, block #4 of the fifth FBMC symbol 605, block #3 of the sixth FBMC symbol 606, block #2 of the seventh FBMC symbol 607, and block #1 of the eighth FBMC symbol 608 are transmitted in an overlapping manner. Block #8 of the second FBMC symbol 602, block #7 of the third FBMC symbol 603, block #6 of the fourth FBMC symbol 604, block #5 of the fifth FBMC symbol 605, block #4 of the sixth FBMC symbol 606, block #3 of the seventh FBMC symbol 607, and block #2 of the eighth FBMC symbol 608 are transmitted in an overlapping manner. Block #8 of the third FBMC symbol 603, block #7 of the fourth FBMC symbol 604, block #6 of the fifth FBMC symbol 605, block #5 of the sixth FBMC symbol 606, block #4 of the seventh FBMC symbol 607, and block #3 of the eighth FBMC symbol 608 are transmitted in an overlapping manner. Block #8 of the fourth FBMC symbol 604, block #7 of the fifth FBMC symbol 605, block #6 of the sixth FBMC symbol 606, block #5 of the seventh FBMC symbol 607, and block #4 of the eighth FBMC symbol 608 are transmitted in an overlapping manner. Block #8 of the fifth FBMC symbol 605, block #7 of the sixth FBMC symbol 606, block #6 of the seventh FBMC symbol 607, and block #5 of the eighth FBMC symbol 608 are transmitted in an overlapping manner. Block #8 of the sixth FBMC symbol 606, block #7 of the seventh FBMC symbol 607, and block #6 of the eighth FBMC symbol 608 are transmitted in an overlapping manner. Block #8 of the seventh FBMC symbol 607 and block #7 of the eighth FBMC symbol 608 are transmitted in an overlapping manner, and block #8 of the eighth FBMC symbol 608 is transmitted without overlapping.

As shown in FIG. 6, the FBMC symbols are transmitted in an overlapping manner. However, since a portion of the FBMC symbol rather than the entire FBMC symbol overlaps, a time longer than the duration of one FBMC symbol is required to transmit the plurality of FBMC symbols. Referring to FIG. 6, the number of overlapping blocks varies according to a time position. That is, eight blocks overlap one another at a certain time, whereas a smaller number of blocks overlap one another or only one block is transmitted at other times. Accordingly, the total time required to transmit can be reduced by shifting transmitting times of blocks in some FBMC symbols. For example, the transmitting times of the blocks may be shifted as shown in FIG. 7.

Figure 7:
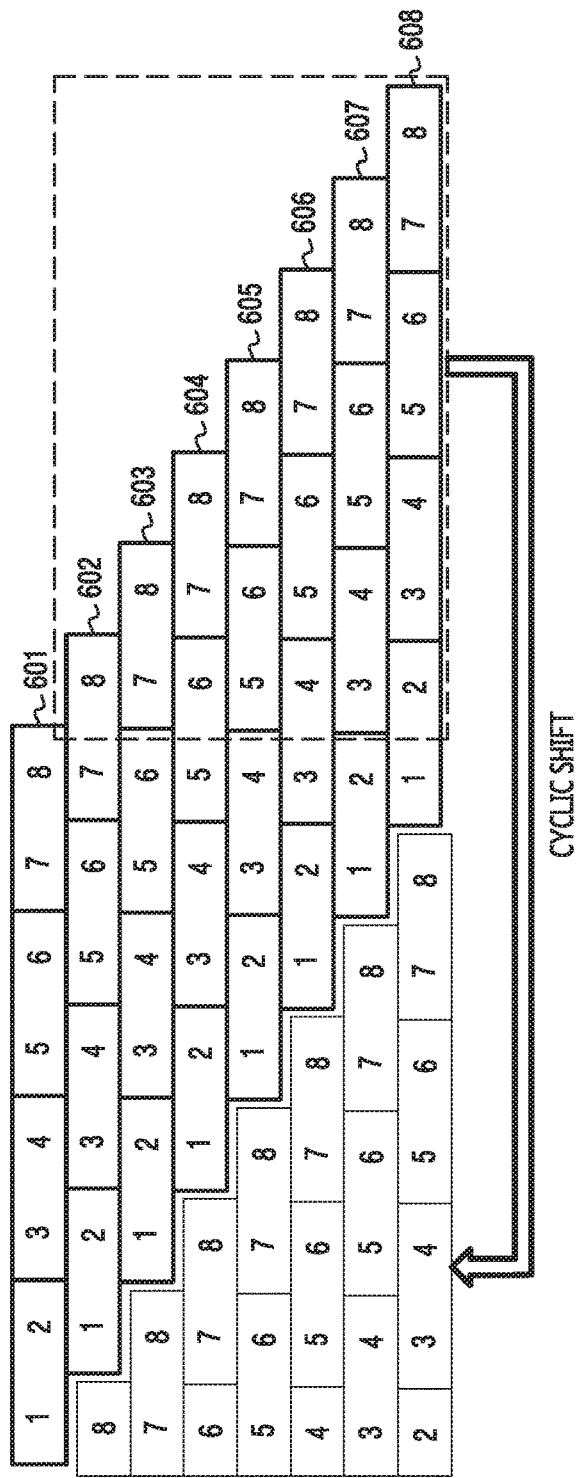
FIG. 7 illustrates an example of a circular shift regarding FBMC symbols in a wireless communication system according to an exemplary embodiment of the present invention.

FIG. 7 illustrates an example of a circular shift regarding FBMC symbols in a wireless communication system according to an embodiment of the present invention. Referring to FIG. 7, a portion of blocks of a portion of the FBMC symbols 601 to 608 is circularly shifted such that eight (8) FBMC symbols 601 to 608 are transmitted for the duration corresponding to eight (8) blocks. Specifically, block #8 of the second FBMC symbol 602, blocks #7 and #8 of the third FBMC symbol 603, blocks #6, #7, and #8 of the fourth FBMC symbol 504, blocks #5, #6, #7, and #8 of the fifth FBMC symbol 605, blocks #4, #5, #6, #7, and #8 of the sixth FBMC symbol 606, blocks #3, #4, #5, #6, #7, and #8 of the seventh FBMC symbol 607, and blocks #2, #3, #4, #5, #6, #7, and #8 of the eighth FBMC symbol 608 are shifted.

Figure 8A:
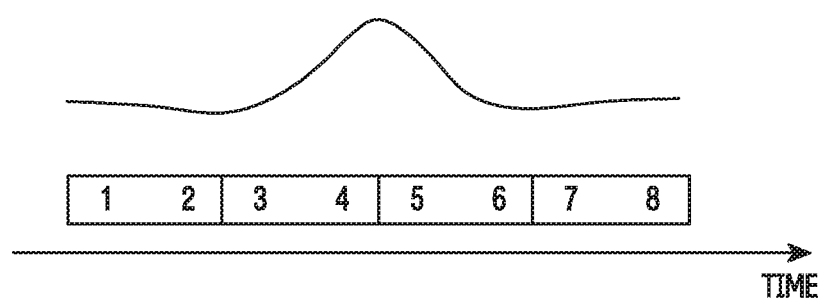
FIGS. 8A and 8B illustrate a change in the distribution of energy caused by a circular shift of FBMC symbols in a wireless communication system according to an exemplary embodiment of the present invention.
Figure 8B:
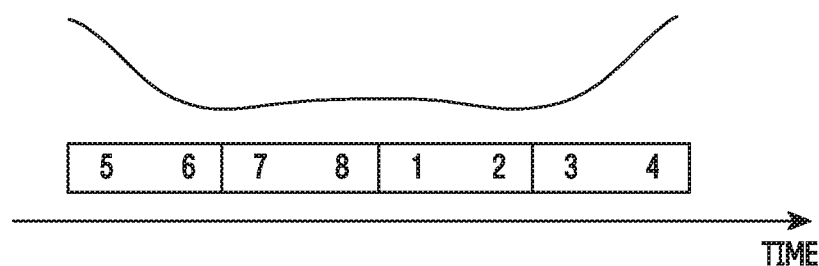

When blocks are shifted as shown in FIG. 7, distribution of energy on a time axis of an FBMC symbol may be changed as shown in FIGS. 8A and 8B. FIGS. 8A and 8B illustrate a change in distribution of energy caused by a circular shift of an FBMC symbol in a wireless communication system according to an embodiment of the present invention. FIG. 8A, illustrates an order of blocks and distribution of energy before the blocks are shifted, and FIG. 8B illustrates an order of blocks and distribution of energy after the blocks are shifted. Referring to of FIG. 8A, energy of an FBMC symbol is confined to the center of the symbol. The FBMC symbol has the feature of low inter-symbol interference due to the time energy confinement as shown in FIG. 8A. However, high energy appears at both ends of the symbol due to a block shift as shown in FIG. 8B. In other words, the feature of well-localization of a filter is destroyed. Accordingly, inter-symbol interference may greatly increase. Therefore, the present invention will describe various embodiments on a more effective block shift performed considering inter-symbol interference.

Figure 9:
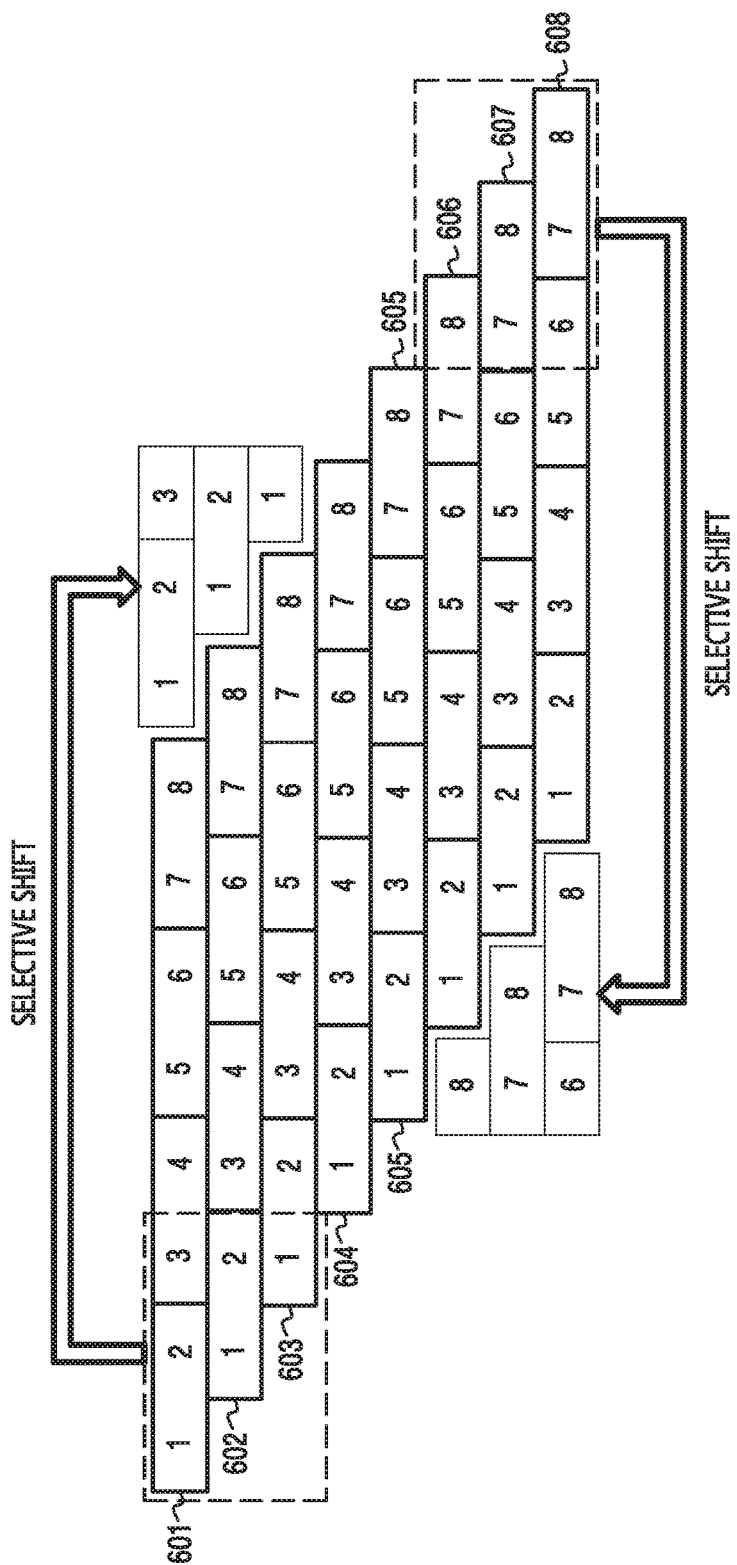
FIG. 9 illustrates an example of a selective shift regarding FBMC symbols in a wireless communication system according to an exemplary embodiment of the present invention.

FIG. 9 illustrates an example of a selective shift of FBMC symbols in a wireless communication system according to an embodiment of the present invention. FIG. 9 illustrates an example of a block shift performed considering increasing inter-symbol interference.

Referring to FIG. 9, a portion of blocks of a portion of the FBMC symbols 601 to 608 is circularly shifted such that eight (8) FBMC symbols 601 to 608 are transmitted for the duration corresponding to one FBMC symbol section, that is, eight (8) blocks. In this case, unlike in the case of FIG. 7, only the blocks (for example, four (4) blocks) less than half of the total number of blocks of the FBMC symbol (for example, eight (8) blocks) are shifted. Specifically, blocks #1, #2, and #3 of the first FBMC symbol 601, blocks #1 and #2 of the second FBMC symbol 602, and block #1 of the third FBMC block 603 are shifted to the rear ends of the corresponding FBMC symbols. In addition, block #8 of the sixth FBMC symbol 606, blocks #7 and #8 of the seventh FBMC symbol 607, and blocks #6, #7, and #8 of the eighth FBMC symbol 608 are shifted to the front ends of the corresponding FBMC symbols.

As shown in FIG. 9, a portion of blocks of the first FBMC symbol 601, the second FBMC symbol 602, the third FBMC symbol 603, the sixth FBMC symbol 606, the seventh FBMC symbol 607, and the eighth FBMC symbol 608 from among the eight (8) FBMC symbols 601 to 608 is shifted. In this case, the maximum number of shifted blocks per FBMC symbol is three (3). That is, since the case in which half of the blocks are shifted does not arise, a situation in which the maximum value of energy appears at both ends of the FBMC symbol as shown in FIG. 8B may not occur. Simultaneously, the blocks are re-arranged as shown in FIG. 10, such that a time required to transmit a signal can be reduced.

FIG. 10 illustrates FBMC symbols after blocks are selectively shifted in a wireless communication system according to an embodiment of the present invention. FIG. 10 illustrates FBMC symbols 1001 to 1008 selectively shifted. Referring to FIG. 10, the first FBMC symbol 1001, the second FEMC symbol 1002, the third FBMC symbol 1003, and the fourth FBMC symbol 1004 are transmitted for the same duration, and the fifth FBMC symbol 1005, the sixth FBMC symbol 1006, the seventh FBMC symbol 1007, and the eighth FBMC symbol 1008 are transmitted for the same duration. As a result, since none of the selectively shifted FBMC symbols 1001 to 1008 correspond to the case shown in of FIG. 8B, the situation in which the feature of well-localization is destroyed does not occur. That is, the selective shift as shown in FIG. 9 may reduce power spectrum density (hereinafter, referred to as "PSD") and degradation of channel reception performance, and may reduce the time required to transmit a signal.

Figure 11A:
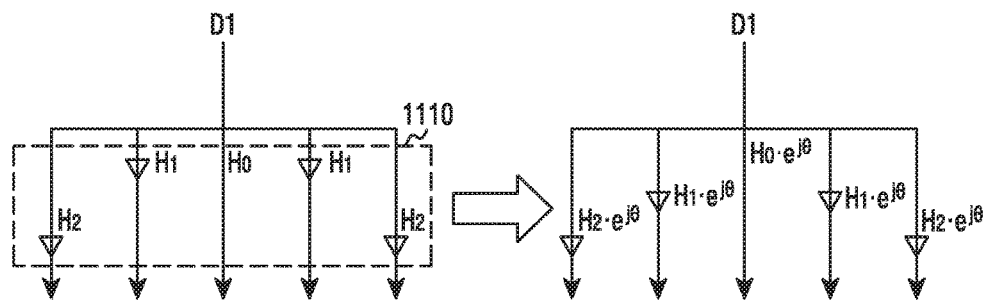
FIGS. 11A, 11B, and 11C illustrate methods for generating FBMC symbols in which sample values are shifted according to an exemplary embodiment of the present invention.
Figure 11B:
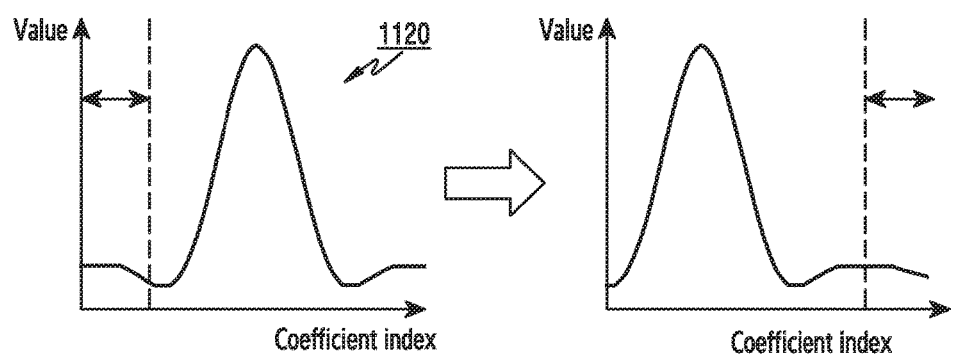
Figure 11C:
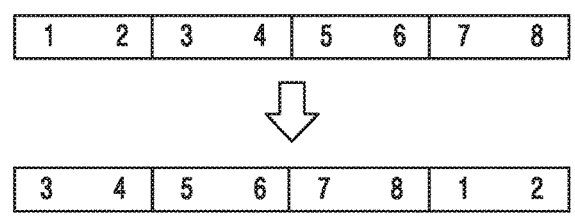

The FBMC symbols in which sample values are shifted on a block basis as shown in FIG. 10 may be generated through a process as shown in FIGS. 11A and 11B, and 11C. FIGS. 11A, 11B, and 11C illustrate methods for generating an FBMC symbol in which sample values are shifted according to an embodiment of the present invention. FIG. 11A illustrates a method for a case in which frequency-axis filtering is used, FIG. 11B illustrates a method for a case in which time-axis filtering is used, and FIG. 11C illustrates a method which is applicable regardless of a domain in which filtering is performed.

Referring to FIG. 11A, when filtering is performed on a frequency axis to generate an FBMC symbol, a frequency domain filter 1110 is used. In this case, a shift of FBMC sample values is a cyclic shift on a time axis and this corresponds to a phase shift on a frequency axis. Accordingly, as shown in FIG. 11A, an FBMC symbol in which samples are shifted may be generated by changing phases of coefficients of the frequency domain filter 1110.

Referring to FIG. 11B, when filtering is performed on a frequency axis to generate an FBMC symbol, a time domain filter 1120 is used. Since a shift of FBMC sample value is a cyclic shift on a time axis, an FBMC symbol in which samples are shifted may be generated by circularly shifting coefficients of the time domain filter 1120 in the same manner.

Referring to FIG. 11C, an FBMC symbol in which samples are shifted may be generated by directly shifting a portion of sample values of the FBMC symbol generated through filtering and an IFFT arithmetic operation unlike in FIGS. 11A and 11B.

FIGS. 11A, 11B, and 11C illustrate methods for generating an FBMC symbol in which samples are shifted at the transmitting end. The methods of FIGS. 11A, 11B, and 11C may be similarly applied to the case in which an FBMC symbol in which samples are shifted is detected at the receiving end. For example, the receiving end may detect the FBMC symbol by performing an FFT arithmetic operation with respect to as many samples as the length of the FBMC symbol in the reception signal, and performing frequency axis filtering using the phase-changed coefficients as shown in FIG. 11A. Alternatively, the receiving end may detect the FBMC symbol by performing filtering with respect to as many samples as the length of the FBMC symbol in the reception signal using the circularly shifted time axis filter as shown in FIG. 11B, and performing the FFT arithmetic operation.

Figure 12:
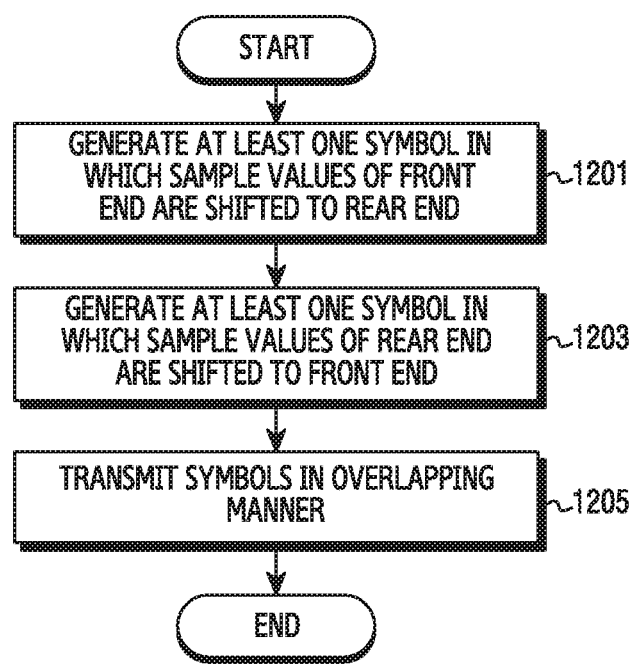
FIG. 12 illustrates an operation procedure of a transmitting end in a wireless communication system according to an exemplary embodiment of the present invention.

FIG. 12 illustrates an operation procedure of a transmitting end in a wireless communication system according to an embodiment of the present invention. FIG. 12 illustrates a method for operating of the transmitting end 110.

Referring to FIG. 12, the transmitting end generates at least one symbol in which samples values of a front end are shifted to a rear end in step 1201. Herein, the sample values may constitute at least one block and the symbol includes an FBMC symbol. Specifically, the transmitting end may generate at least one FBMC symbol using a frequency domain filter in which phases of coefficients are changed. Alternatively, the transmitting end may generate at least one FBMC symbol using a time domain filter in which coefficients of a front end from among coefficients of the filter are shifted to a rear end. Alternatively, the transmitting end may generate at least one FBMC symbol and may shift sample values of the front end of the at least one FBMC symbol to the rear end. Herein, the at least one symbol in which the sample values of the front end are shifted to the rear end includes at least one symbol to be transmitted earlier when there is no sample shift from among the plurality of symbols transmitted in an overlapping manner. In this case, the transmitting end generates at least one symbol in which a number of samples less than half of the total number of samples in the symbol are shifted. For example, when the symbol is formed of N samples, sample less than N/2 are shifted.

Next, the transmitting end proceeds to step 1203 to generate at least one symbol in which sample values of a rear end are shifted to a front end. Herein, the sample values may constitute at least one block and the symbol includes an FBMC symbol. Specifically, the transmitting end may generate at least one FBMC symbol using a frequency domain filter in which phases of coefficients are changed. Alternatively, the transmitting end may generate at least one FBMC symbol using a time domain filter in which coefficients of a rear end from among coefficients of the filter are shifted to a front end. Alternatively, the transmitting end may generate at least one FBMC symbol and may shift sample values of the rear end of the at least one FBMC symbol to the front end. Herein, the at least one symbol in which the sample values of the rear end are shifted to the front end includes at least one symbol to be transmitted later when there is no sample shifted from among the plurality of symbols transmitted in an overlapping manner. In this case, the transmitting end generates at least one symbol in which a number of samples less than half of the total number of samples of the symbol are shifted. For example, when the symbol is formed of N samples, samples less than N/2 are shifted.

Thereafter, the transmitting end proceeds to step 1205 to transmit the symbols in an overlapping manner. In this case, the transmitting end may transmit the symbols which are reconfigured by shifting the sample values, and transmit all or a portion of the symbols in the overlapping manner. Accordingly, the transmitting end may transmit the symbols for short duration in comparison to the case in which there is no sample shift. That is, the transmitting end may configure one set of symbols and shift samples values of at least one symbol from among the symbols in the set, such that the time required to transmit the symbols can be reduced.

In the embodiment illustrated in FIG. 12, the transmitting end generates at least one symbol in which samples of a front end are shifted to a rear end in step 1201, and generates at least one symbol in which sample values of a rear end are shifted to a front end in step 1203. However, according to another embodiment of the present invention, step 1201 or 1203 may be omitted. For example, the transmitting end may perform only one of steps 1201 and 1203 according to the number of FBMC symbols to be transmitted in the overlapping manner.

Figure 13:
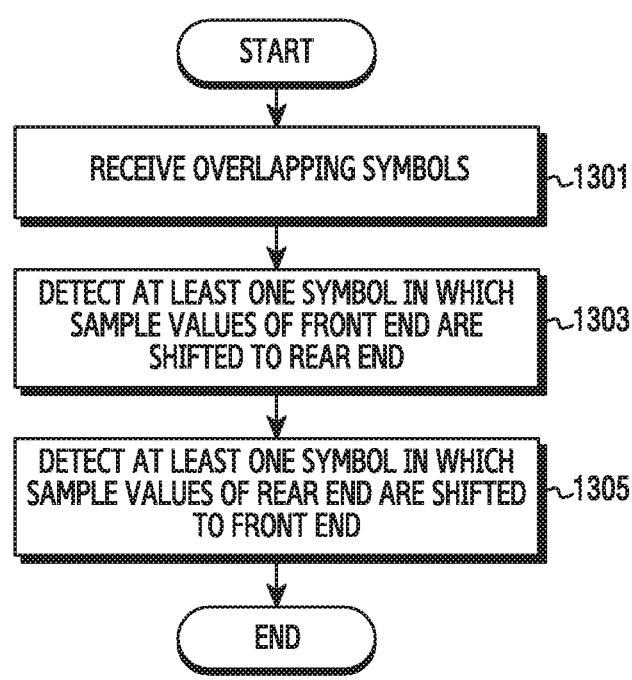
FIG. 13 illustrates an operation procedure of a receiving end in a wireless communication system according to an exemplary embodiment of the present invention.

FIG. 13 illustrates an operation procedure of a receiving end in a wireless communication system according to an embodiment of the present invention. FIG. 13 illustrates a method for operating of the receiving end 120.

Referring to FIG. 13, the receiving end receives overlapping symbols in step 1301. Herein, the symbols include FBMC symbols and the symbols are transmitted by the transmitting end in an overlapping manner in entirety or in part after being selectively shifted. Accordingly, the receiving end may receive the symbols for short duration in comparison to the case in which there is no sample shift.

Thereafter, the receiving end proceeds to step 1303 to detect at least one symbol in which samples values of a front end are shifted to a rear end. Herein, the sample values may constitute at least one block and the symbol includes an FBMC symbol. Specifically, the receiving end may detect at least one FBMC symbol using a frequency domain filter in which phases of coefficients are changed. Alternatively, the receiving end may detect at least one FBMC symbol using a time domain filter in which coefficients of a front end from among coefficients of the filter are shifted to a rear end. Herein, the at least one symbol in which the sample values of the front end are shifted to the rear end includes at least one symbol to be received earlier when there is no sample shift from among the plurality of symbols received in an overlapping manner. In this case, the receiving end detects at least one symbol in which a number of samples less than half of the total number of samples in the symbol are shifted. For example, when the symbol is formed of N samples, sample less than N/2 are shifted.

Next, the receiving end proceeds to step 1305 to detect at least one symbol in which samples values of a rear end are shifted to a front end. Herein, the sample values may constitute at least one block and the symbol includes an FBMC symbol. Specifically, the receiving end may detect at least one FBMC symbol using a frequency domain filter in which phases of coefficients are changed. Alternatively, the receiving end may detect at least one FBMC symbol using a time domain filter in which coefficients of a rear end from among coefficients of the filter are shifted to a front end. Herein, the at least one symbol in which the sample values of the rear end are shifted to the front end includes at least one symbol to be received later when there is no sample shift from among the plurality of symbols received in an overlapping manner. In this case, the receiving end detects at least one symbol in which a number of samples less than half of the total number of samples in the symbol are shifted. For example, when the symbol is formed of N samples, sample less than N/2 are shifted.

In the embodiment illustrated in FIG. 13, the receiving end detects at least one symbol in which samples of a front end are shifted to a rear end in step 1303, and detects at least one symbol in which sample values of a rear end are shifted to a front end in step 1305. However, according to another embodiment of the present invention, step 1303 or 1305 may be omitted. For example, the receiving end may perform only one of steps 1303 and 1305 according to the number of FBMC symbols to be transmitted in the overlapping manner.

According to an embodiment of the present invention as described above, the transmitting end generates a symbol in which sample values are selectively shifted, and the receiving end detects the symbol in which the sample values are selectively shifted, such that the time required to transmit a signal can be reduced. In this case, a specific pattern regarding a shift of sample values may be differently determined according to various criteria. For example, the pattern regarding the shift of the sample values may be determined based on an amount of data to be transmitted, interference by an adjacent channel, or the like. Hereinafter, the present invention describes embodiments for adaptively controlling a pattern regarding a sample value shift. For convenience of explanation, the pattern regarding the shift of the sample values will be referred to as a "shift pattern."

Figure 14:
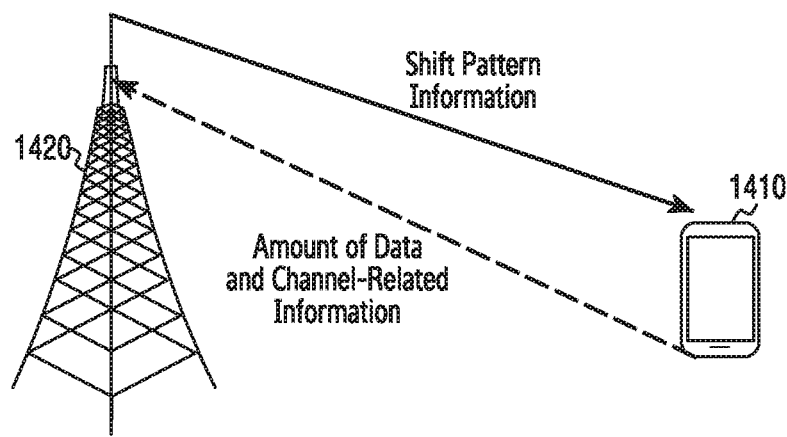
FIG. 14 illustrates a base station and a terminal in a wireless communication system according to an exemplary embodiment of the present invention.

FIG. 14 illustrates a base station and a terminal in a wireless communication system according to an embodiment of the present invention. Referring to FIG. 14, the terminal 1410 and the base station 1420 perform communication. Herein, the terminal 1410 may operate as the transmitting end 110 of FIG. 1 and the base station 1420 may operate as the receiving end 120 of FIG. 1. The terminal 1410 transmits information regarding an amount of data to be transmitted and channel-related information to the base station 1420. The channel-related information may include at least one of information on whether an adjacent band is used or not and a degree of interference by the adjacent band. Accordingly, the base station 1420 may determine a shift pattern for the terminal 1410, that is, a shift pattern to be applied to FBMC symbols transmitted to the terminal 1410. In addition, the base station 1420 may transmit information indicating the shift pattern to the terminal 1410.

Herein, the shift pattern may be indicated by a cyclic shift value and an offset value. The cyclic shift value refers to the number of shifted blocks or samples, and the offset value refers to a variation in transmitting time of the FBMC symbol. For example, in the case of the first FBMC symbol 501 of FIGS. 8A and 8B, the cyclic shift value is three blocks and the offset value is +3 blocks. Approximate trends of the cyclic shift value and the offset value are as in table 1 presented below according to an amount of data and a need for a guard band:

TABLE 1

|  | Much data | Less data |
| --- | --- | --- |
| Wide guard band is needed | Relatively low cyclic shift value | Relatively low cyclic shift value |
|  | Relatively low offset value | Relatively large offset value |

TABLE 1-continued

|  | Much data | Less data |
|---|---|---|
| Narrow guard band is needed | Relatively large cyclic shift value<br>Relatively low offset value | Relatively large cyclic shift value<br>Relatively large offset value |

Table 1 implies that a wide guard band is needed in an environment in which an adjacent band is in use and there is interference by the adjacent band. In this case, since it is advantageous to maintain the feature of energy confinement of the FBMC symbol to mitigate the interference, a low cyclic shift value is preferable. In addition, in the case of less data, it is advantageous to overlap more blocks on a time axis. Therefore, a large offset value is preferable. An example of FBM symbols in which samples are shifted according to the criterion of table 1 is illustrated in FIGS. 15A, 15B, 15C and 15D.

Figures 15A, 15B, 15C, 15D:
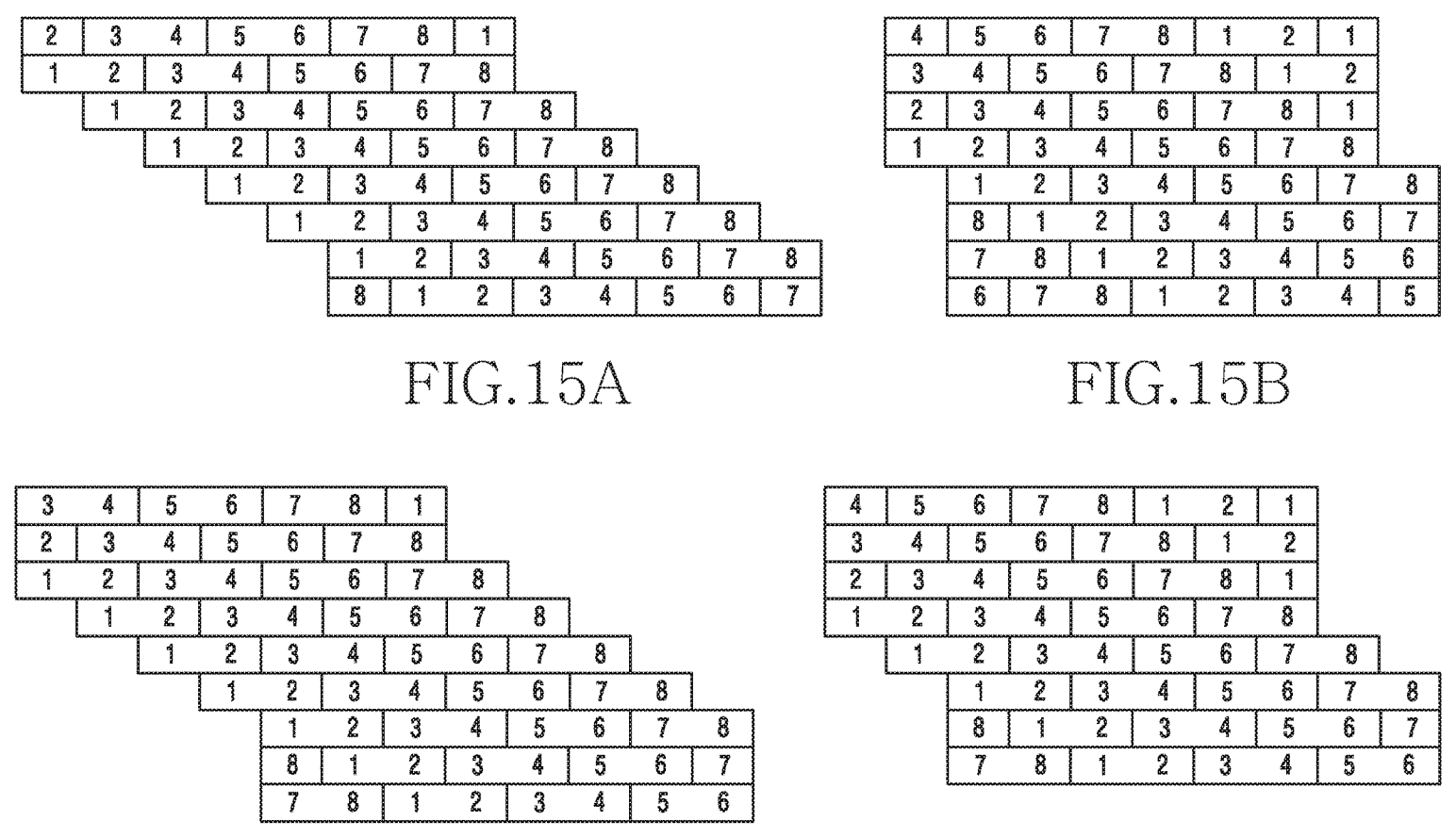

FIGS. 15A, 15B, 15C and 15D illustrate examples of shift patterns according to a communication environment in a wireless communication system according to an embodiment of the present invention. FIG. 15A, illustrates a case in which an amount of data is large and a wide guard band is needed, FIG. 15B illustrates a case in which an amount of data is small and a wide guard band is needed, FIG. 15C illustrates a case in which an amount of data is large and a narrow guard band is needed, and FIG. 15D illustrates a case in which an amount of data is small and a narrow guard band is needed. Specifically, referring to FIG. 15A, the maximum cyclic shift value is 1 and the offset value is 1. Referring to FIG. 15B, the maximum cyclic shift value is 3 and the offset value is 3. Referring to FIG. 15C, the maximum cyclic shift value is 2 and the offset value is 2. Referring to FIG. 15D, the maximum cyclic shift value is 3 and the offset value is 3.

Referring to FIGS. 15A, 15B, 15C and 15D, in the case in which samples are shifted as indicated by the shift pattern, overlapping transmission of symbols starts at the time when the first symbol from among symbols without having samples shifted, that is, symbols listed according to the order of blocks, starts to be transmitted. In addition, the overlapping transmission of the symbols finishes at the time when transmission of the lastly transmitted symbol from among the symbols without having samples shifted, that is, the symbols listed according to the order of blocks, finishes. For example, in the case FIG. 15A, the second FBMC symbol is transmitted first from among the symbols without having samples shifted, and the first FBMC symbol starts to be transmitted at the time when the second FBMC symbol starts to be transmitted. In addition, the seventh FBMC symbol is lastly transmitted from among the symbols without having samples shifted, and transmission of the eighth FBMC symbol also finishes at the time when the transmission of the seventh FBMC symbol finishes. From the transmission starting time of the first transmitted symbol from among the symbols without having samples shifted until the transmission finishing time of the lastly transmitted symbol, all symbols in the corresponding set are transmitted.

Figure 16:
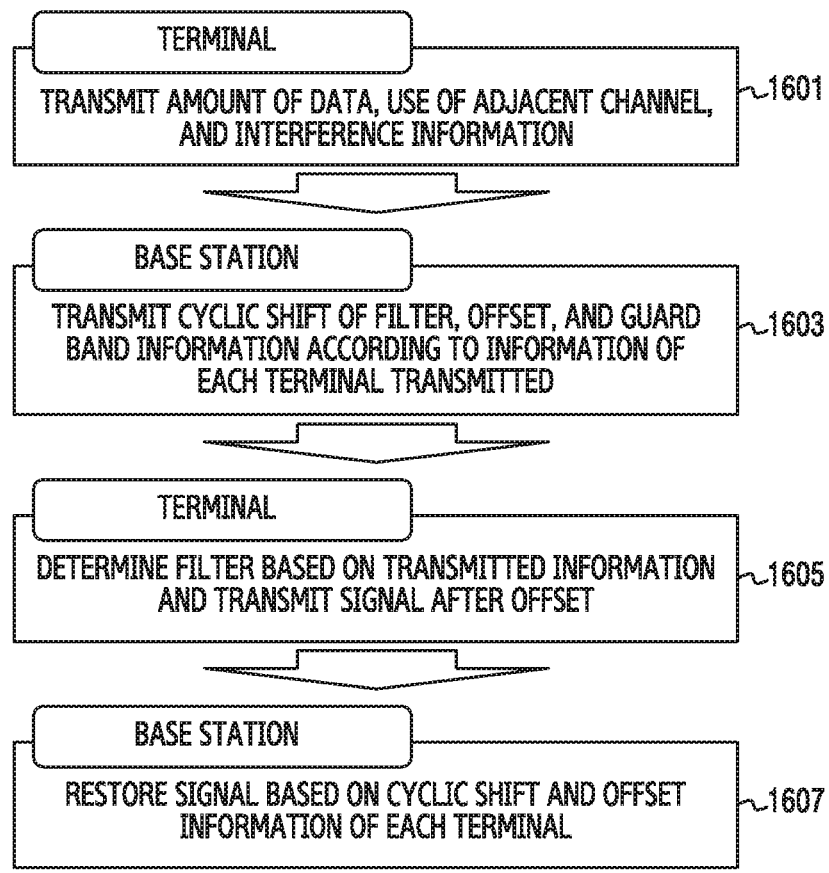
FIG. 16 illustrates an operation procedure of a base station and a terminal for controlling a shift pattern in a wireless communication system according to an exemplary embodiment of the present invention.

FIG. 16 illustrates an operation procedure of a base station and a terminal for controlling a shift pattern in a wireless communication system according to an embodiment of the present invention. FIG. 16 illustrates an example of a method for operating of the terminal 1410 and the base station 1420.

Referring to FIG. 16, the terminal transmits information on an amount of data and use of an adjacent channel and interference by the adjacent channel to the base station. In other words, the terminal transmits information necessary for determining a shift pattern. In this case, each of a plurality of terminals may provide information necessary for determining the shift pattern to the base station.

In step 1603, the base station transmits information on a cyclic shift of a filter, an offset, and a guard band according to the information transmitted from each terminal. Herein, the guard band information may be excluded. That is, the base station may determine a size of a guard band and an amount of data as needed based on the information received from the terminal, and determine a shift pattern for each terminal based on the size of the guard band and the amount of data as needed.

In step 1605, the terminal determines a filter based on the information transmitted from the base station, and transmits a signal after applying an offset value. In other words, the terminal adjusts filter coefficients according to a cyclic shift value indicated by the shift pattern, and transmits generated FBMC symbols at a time determined by the offset value.

In step 1607, the base station restores the signal based on the information on the cyclic shift value for each terminal and the offset value. That is, the base station extracts FBMC samples from the reception signal according to the offset value indicated by the shift pattern, and performs filtering using a time domain filter or a frequency domain filter corresponding to the cyclic shift value.

An embodiment described with reference to FIG. 16 is related to uplink communication. However, according to another embodiment of the present invention, the procedure illustrated in FIG. 16 may be similarly applied to downlink communication. In this case, the information exchanged between the terminal and the base station, that is, the information on the use of an adjacent channel and interference by the adjacent channel between terminals, may be substituted with information on use of an adjacent channel and interference by the adjacent channel between base stations. For example, when the base station performs cooperative transmission (for example, coordinates multi-point (CoMP) communication), use of an adjacent channel and interference by the adjacent channel between base stations may be caused, and thus, the procedure of FIG. 16 may be similarly applied to downlink communication.

Accordingly, the terminal may determine the information on the cyclic shift, the offset, and the guard band, or one of the base stations may determine the information on the cyclic shift, the offset, and the guard band. In addition, a shift pattern for each base station may be determined according to the information on the cyclic shift, the offset, and the guard band, and information on the shift pattern is transmitted to the base stations. Accordingly, the base stations may apply their respective shift patterns (for example, cyclic shift values, offset values) to the FBMC symbols.

Figure 17:
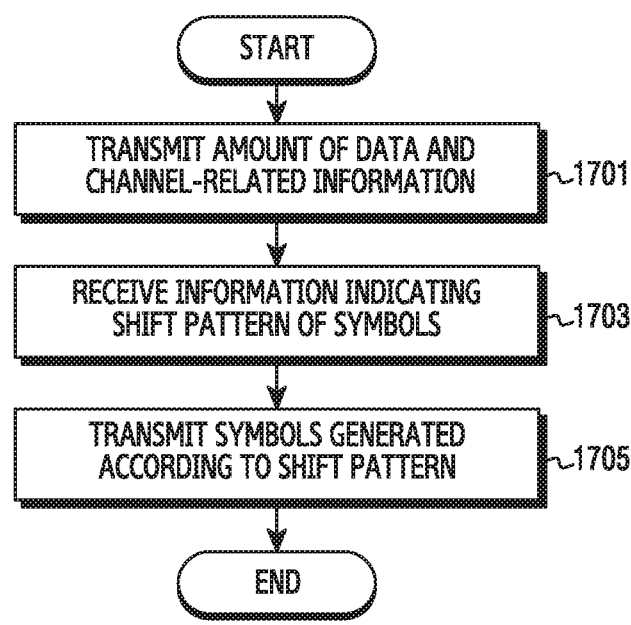
FIG. 17 illustrates an operation procedure of a terminal in a wireless communication system according to an exemplary embodiment of the present invention.

FIG. 17 illustrates an operation procedure of a terminal in a wireless communication system according to an embodiment of the present invention. FIG. 17 illustrates a method for operating of the transmitting end 110 or the terminal 1410. That is, the procedure illustrated in FIG. 17 may be performed not only by the terminal 1410 performing uplink communication, but also by a device transmitting a signal, and thus may be performed by a base station performing downlink communication.

Referring to FIG. 17, the terminal transmits an amount of data and channel-related information to the base station in step 1701. Herein, the channel-related information includes at least one of information on whether an adjacent channel is used and interference information. In other words, the terminal transmits information necessary for determining a shift pattern.

Next, the terminal proceeds to step 1703 to receive information indicating a shift pattern from the base station. The shift pattern may be defined by a cyclic shift value and an offset value. For example, the shift pattern may be indicated by cyclic shift values and offset values of each FBMC symbol, may be indicated by a cyclic shift value and an offset value regarding one FBMC symbol, or may be indicated by an indicator value based on a pre-defined matching relationship.

Next, the terminal proceeds to step 1705 to transmit symbols which are generated according to the shift pattern. In other words, the terminal may adjust a frequency domain filter or a time domain filter according to the shift pattern, generate FBMC symbols using the adjusted filter, and then transmit the FBMC symbols in an overlapping manner. Alternatively, the terminal may generate FBMC symbols and shift a portion of sample values according to the shift pattern, and then may transmit the FBMC symbols in an overlapping manner.

Figure 18:
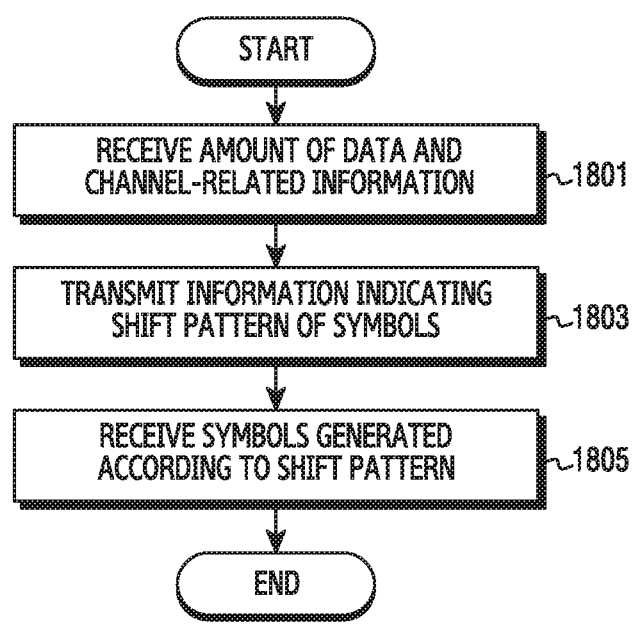
FIG. 18 illustrates an operation procedure of a base station in a wireless communication system according to an exemplary embodiment of the present invention.

FIG. 18 illustrates an operation procedure of a base station in a wireless communication system according to an embodiment of the present invention. FIG. 18 illustrates a method for operating of the receiving end 120 or the base station 1420. That is, the procedure illustrated in FIG. 18 may be performed not only by the base station 1420 performing uplink communication, but also by a device receiving a signal, and thus may be performed by a terminal performing downlink communication.

Referring to FIG. 18, the base station receives an amount of data and channel-related information from the terminal in step 1801. Herein, the channel-related information includes at least one of information on whether an adjacent channel is used and interference information. In other words, the base station receives information necessary for determining a shift pattern.

Next, the base station proceeds to step 1803 to transmit information indicating a shift pattern to the terminal. That is, the base station may determine a shift pattern for the terminal based on the amount of data and the channel-related information received from the terminal, and informs the shift pattern. For example, the shift pattern may be indicated by cyclic shift values and offset values of each FBMC symbol, may be indicated by a cyclic shift value and an offset value regarding one FBMC symbol, or may be indicated by an indicator value based on a pre-defined matching relationship.

Thereafter, the base station proceeds to step 1805 to receive symbols which are generated according to the shift pattern. Accordingly, the base station may detect FBMC symbols using a frequency domain filter or a time domain filter which is adjusted according to the shift pattern. Specifically, the base station may extract FBMC samples from a reception signal according to the offset value indicated by the shift pattern, and perform filtering using the time domain filter or the frequency domain filter corresponding to the cyclic shift value.

Figure 19:
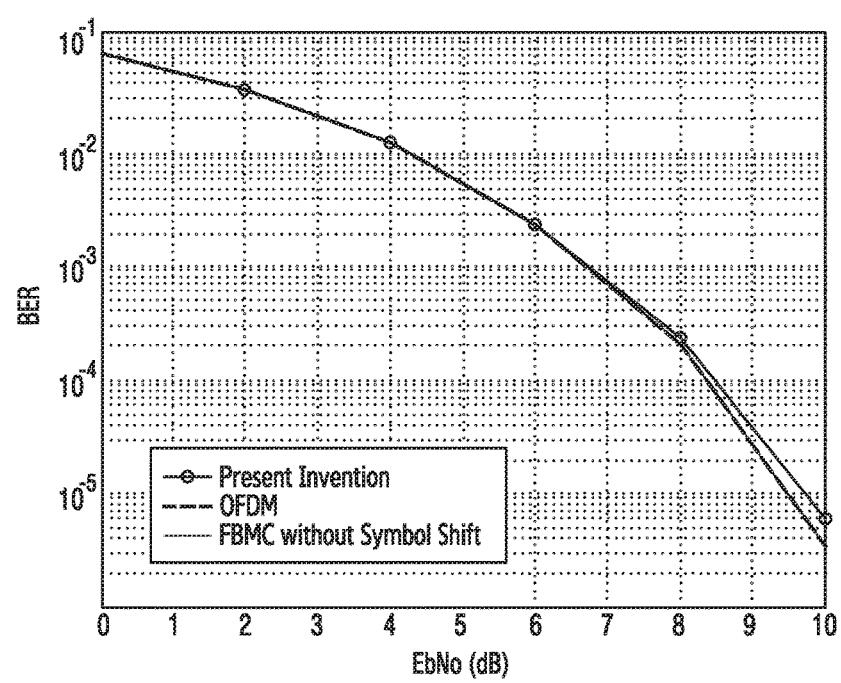
FIGS. 19 to 21 illustrate results of simulations regarding a wireless communication system according to an exemplary embodiment of the present invention.
Figure 20:
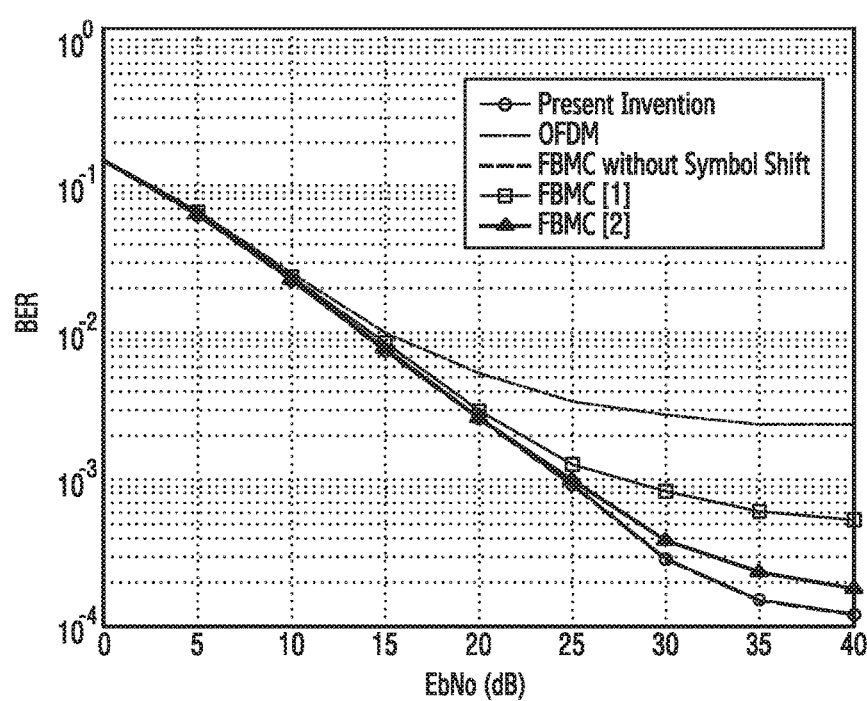
Figure 21:
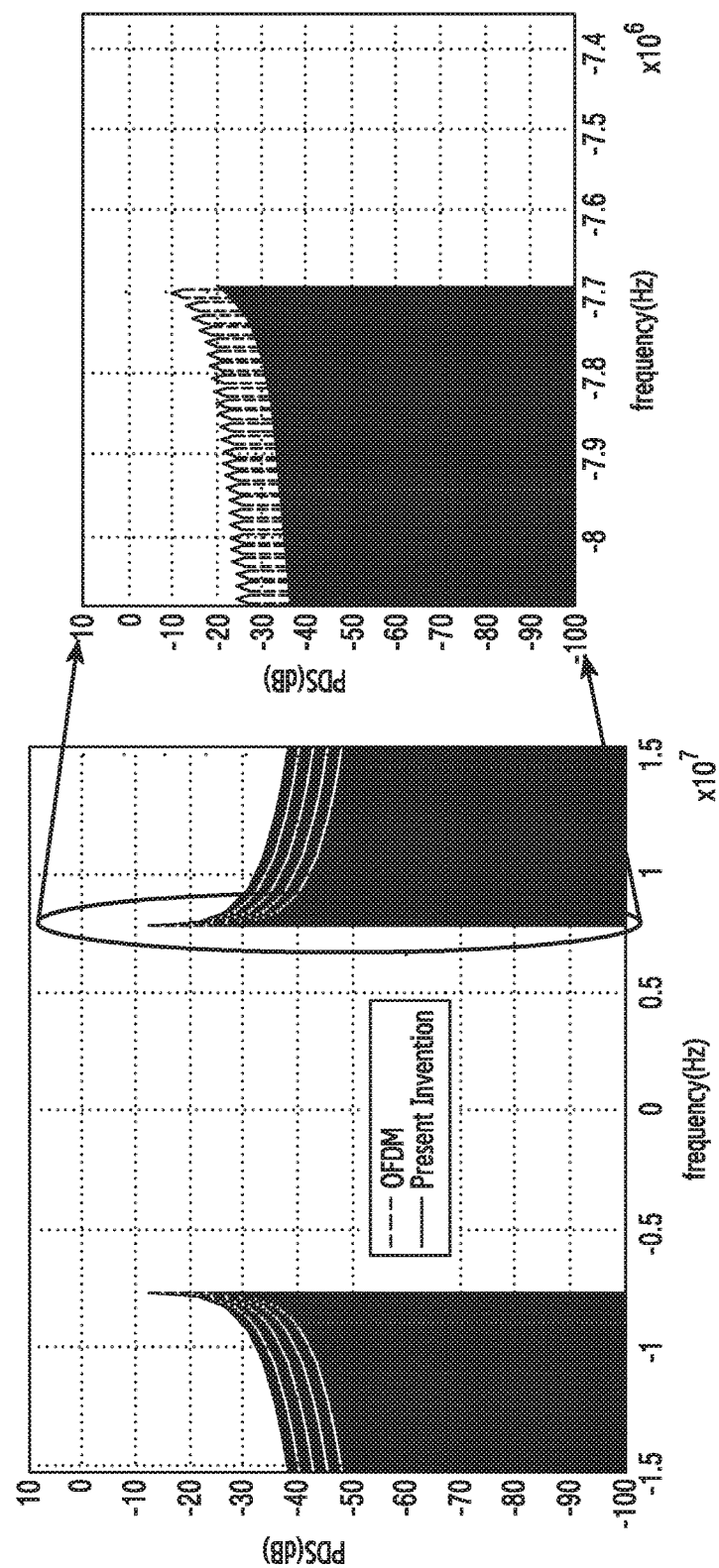

FIGS. 19 to 21 illustrate results of simulations regarding a wireless communication system according to an embodiment of the present invention.

FIG. 19 illustrates comparison of, in performance in an additional white Gaussian noise (AWGN) channel, an FBMC technique applying a selective shift according an embodiment of the present invention, an orthogonal frequency division multiplexing (hereinafter, referred to as "OFDM") technique, and an FBMC technique without a sample shift. In the simulation of FIG. 19, a modulation scheme was quadrature phase shift keying (QPSK), an IFFT/FFT size was 1024, an overlapping factor for the FBMC technique was 4, and a cyclic prefix (CP) length for the OFDM technique was 0. In addition, a filter order K for the FBMC technique was 4 and the frequency domain filter H was set as H0=1, H1=0.9718, H2=0.7071, and H3=4114. Referring to FIG. 19, the technique according to an embodiment of the present invention and the related-art FBMC technique without the sample shift have the same bit error rate (BER). That is, the technique according to an embodiment of the present invention can reduce the time required to transmit while maintaining orthogonality at the same level as the related-art FBMC technique without the sample shift.

FIG. 20 illustrates comparison of, in performance in an international telecommunication union (ITU)-vehicular channel, the FBMC technique applying the selective shift according to an embodiment of the present invention, the OFDM technique, the FBMC technique without the sample shift, an FBMC technique [1] suggested in 「H. Lin and P. Siohan, "An advanced multi-carrier modulation for future radio systems," IEEE ICASSP 2014, Florence, Italy, May 2014.」, and an FBMC technique [2] suggested in 「M. J. Abdoli, M. Jia, and J. Ma, "Weighted circularly convolved filtering in OFDM/OQAM," IEEE PIMRC 2013, London, UK, September 2013」. In the simulation of FIG. 20, a modulation scheme was QPSK, an FFT size was 1024, an overlapping factor for the FBMC technique was 4, and a CP length for the OFDM technique was 128. In addition, a filter order for the FBMC technique was 4, the frequency domain filter H was set as H0=1, H1=0.9718, H2=0.7071, and H3=4114, and the number of FBMC symbols per one transmission block was 16. In addition, a frequency one-tap equalizer was used. Referring to FIG. 20, compared to the FBMC technique [1] and the FBMC technique [2], the system according to an embodiment of the present invention has good robustness to a multi-path channel.

FIG. 21 illustrates comparison of the FBMC technique applying the selective shift according to an embodiment of the present invention and the OFDM technique in PSD performance. Referring to FIG. 21, it can be seen that the FBMC technique according to an embodiment of the present invention shows lower PSD than the OFDM technique in all ranges other than a signal band.

Methods based on the embodiments disclosed in the claims or specification of the present invention can be implemented in hardware, software, or a combination of hardware and software.

When implemented in software, a computer readable recording medium for storing one or more programs (i.e., software modules) can be provided. The one or more programs stored in the computer readable recording medium are configured for execution by one or more processors in an electronic device. The one or more programs include instructions for allowing the electronic device to execute the methods based on the embodiments disclosed in the claims or specification of the present invention.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette.

Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can access via an external port to a device which performs the embodiments of the present invention. In addition, an additional storage device on a communication network may access to a device which performs the embodiments of the present invention.

In the above-described specific embodiments of the present invention, elements included in the present invention are expressed in singular or plural forms according to specific embodiments. However, singular or plural forms are appropriately selected according to suggested situations for convenience of explanation, and the present invention is not limited to a single element or plural elements. An element which is expressed in a plural form may be configured in a singular form or an element which is expressed in a singular form may be configured in plural number.

While specific embodiments have been described in the detailed descriptions of the present invention, various changes can be made within a limit without departing from the scope of the present invention. Therefore, the scope of the present invention should not be limited to and defined by the above-described exemplary embodiments, and should be defined not only by the appended claims but also by the equivalents to the scopes of the claims.

The invention claimed is:

1. A method for operating of a transmitting end in a wireless communication system, the method comprising:
   generating a first symbol in which sample values of a front end are shifted to a rear end;
   generating a second symbol in which sample values of a rear end are shifted to a front end; and
   transmitting a plurality of symbols comprising the first symbol and the second symbol on a time axis in an overlapping manner.

2. The method of claim 1, wherein generating the first symbol comprises generating an FBMC symbol using a frequency domain filter to which a phase shift value corresponding to a number of the sample values is applied or a time domain filter which is circularly shifted as much as the number of the sample values.

3. The method of claim 1, further comprising transmitting, to a receiving end, information for determining a shift pattern of the sample values,
   wherein the information comprises at least one of an amount of data to be transmitted, information on whether an adjacent channel is used or not, and a degree of interference by the adjacent channel.

4. The method of claim 3, further comprising receiving information indicating the shift pattern of the sample values from the receiving end,
   wherein the shift pattern is defined through at least one of a cyclic shift value and an offset value.

5. The method of claim 4, wherein the cyclic shift value decreases as the degree of interference by the adjacent channel increases, and the offset value decreases as the amount of data to be transmitted increases.

6. The method of claim 1, wherein the number of the sample values shifted in the first symbol is less than half of a total number of symbols of the first symbol.

7. An apparatus for a transmitting end in a wireless communication system, the apparatus comprising:
   a transceiver;
   at least one processor operatively coupled with the transceiver, wherein the at least one processor is configured to control to:
   generate a first symbol in which sample values of a front end are shifted to a rear end, and generate a second symbol in which sample values of a rear end are shifted to a front end; and
   transmit a plurality of symbols comprising the first symbol and the second symbol on a time axis in an overlapping manner.

8. The apparatus of claim 7, wherein the at least one processor is configured to control to generate an FBMC symbol using a frequency domain filter to which a phase shift value corresponding to a number of the sample values is applied or a time domain filter which is circularly shifted as much as the number of the sample values.

9. The apparatus of claim 7, wherein the at least one processor is configured to transmit, to a receiving end, information for determining a shift pattern of the sample values,
   wherein the information comprises at least one of an amount of data to be transmitted, information on whether an adjacent channel is used or not, and a degree of interference by the adjacent channel.

10. The apparatus of claim 9, wherein the at least one processor is further configured to control to receive information indicating the shift pattern of the sample values from the receiving end,
    wherein the shift pattern is defined through at least one of a cyclic shift value and an offset value.

11. The apparatus of claim 10, wherein the cyclic shift value decreases as the degree of interference by the adjacent channel increases, and the offset value decreases as the amount of data to be transmitted increases.

12. The apparatus of claim 7, wherein the number of the sample values shifted in the first symbol is less than half of a total number of symbols of the first symbol.

13. An apparatus for a receiving end in a wireless communication system, the apparatus comprising:
    a transceiver; and
    at least one processor operatively coupled with the transceiver,
    wherein the at least one processor is configured to control to:
    receive a signal in which a plurality of symbols overlap one another on a time axis;
    detect a first symbol in which sample values of a front end are shifted to a rear end from among the plurality of symbols; and
    detect a second symbol in which sample values of a rear end are shifted to a front end from among the plurality of symbols.

14. The apparatus of claim 13, wherein the at least one processor is configured to control to detect an FBMC symbol using a frequency domain filter to which a phase shift value corresponding to a number of the sample values is applied or a time domain filter which is circularly shifted as much as the number of the sample values.

15. The apparatus of claim 13, wherein the at least one processor is configured to receive, to a transmitting end, information for determining a shift pattern of the sample values,
    wherein the information comprises at least one of an amount of data to be transmitted, information on whether an adjacent channel is used or not, and a degree of interference by the adjacent channel.

16. The apparatus of claim 15, wherein the at least one processor is further configured to control to transmit information indicating the shift pattern of the sample values from the receiving end,
    wherein the shift pattern is defined through at least one of a cyclic shift value and an offset value.

17. The apparatus of claim 16, wherein the cyclic shift value decreases as the degree of interference by the adjacent channel increases, and the offset value decreases as the amount of data to be transmitted increases.

18. The apparatus of claim 13, wherein the number of the sample values shifted in the first symbol is less than half of a total number of symbols of the first symbol.

\* \* \* \* \*

UNITED STATES PATENT AND TRADEMARK OFFICE
CERTIFICATE OF CORRECTION

PATENT NO. : 10,313,170 B2
APPLICATION NO. : 15/580871
DATED : June 4, 2019
INVENTOR(S) : Yeohun Yun et al.

It is certified that error appears in the above-identified patent and that said Letters Patent is hereby corrected as shown below:

On the Title Page

Item (73), after Samsung Electronics Co., Ltd., Suwon-si (KR) insert -- ; Industry-Academic Cooperation Foundation, Yonsei University, Seoul (KR) --

Signed and Sealed this
Twenty-eighth Day of January, 2020

Andrei Iancu
*Director of the United States Patent and Trademark Office*